(12) United States Patent
Bagheri et al.

(10) Patent No.: US 11,663,799 B1
(45) Date of Patent: *May 30, 2023

(54) SMART IMAGE TAGGING AND SELECTION ON MOBILE DEVICES

(71) Applicant: CCC INTELLIGENT SOLUTIONS INC., Chicago, IL (US)

(72) Inventors: Saeid Bagheri, Chicago, IL (US); Masatoshi Kato, Seattle, WA (US); Christoph Plenio, Batavia, IL (US)

(73) Assignee: CCC INTELLIGENT SOLUTIONS INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,371

(22) Filed: May 23, 2022

Related U.S. Application Data

(63) Continuation of application No. 16/670,860, filed on Oct. 31, 2019, now Pat. No. 11,341,379.

(51) Int. Cl.
*G06V 10/10* (2022.01)
*G06T 7/00* (2017.01)
(Continued)

(52) U.S. Cl.
CPC ............ *G06V 10/10* (2022.01); *G06F 18/214* (2023.01); *G06N 20/00* (2019.01); *G06Q 40/08* (2013.01);
(Continued)

(58) Field of Classification Search
CPC .... G06V 10/10; G06V 20/10; G06V 2201/08; G06F 18/214; G06N 20/00; G06Q 40/08;
(Continued)

(56) References Cited

U.S. PATENT DOCUMENTS

| | | |
|---|---|---|
| 8,712,893 B1 | 4/2014 | Brandmaier et al. |
| 9,060,127 B2 | 6/2015 | Wexler et al. |

(Continued)

OTHER PUBLICATIONS

Freeman, Ido, Lutz Roese-Koerner, and Anton Kummert. "Effnet: An efficient structure for convolutional neural networks." *2018 25th IEEE International Conference on Image Processing (ICIP)*. IEEE (2018).

(Continued)

*Primary Examiner* — Casey L Kretzer
(74) *Attorney, Agent, or Firm* — Marshall, Gerstein & Borun LLP

(57) ABSTRACT

Techniques for automatic image tagging and selection at a mobile device include generating a smart image tagging model by first training an initial model based on different angles of image capture of subject vehicles, and then re-training the trained model using weights discovered from the first training and images that have been labeled with additional tags indicative of different vehicle portions and/or vehicle parameters. Nodes that are training-specific are removed from the re-trained model, and the lightweight model is serialized to generate the smart image tagging model. The generated model may autonomously execute at an imaging device to predict respective tags associated with a stream of frames; select, capture and store respective suitable frames as representative images corresponding to the predicted tags; and provide the set of representative images and associated tags for use in determining vehicle damage, insurance claims, and the like.

20 Claims, 5 Drawing Sheets

(51) Int. Cl.
  *G06N 20/00* (2019.01)
  *G06Q 40/08* (2012.01)
  *G06V 20/10* (2022.01)
  *G06F 18/214* (2023.01)
  *H04N 23/80* (2023.01)

(52) U.S. Cl.
  CPC ............ *G06T 7/0002* (2013.01); *G06V 20/10* (2022.01); *H04N 23/80* (2023.01); *G06T 2207/30248* (2013.01); *G06V 2201/08* (2022.01)

(58) Field of Classification Search
  CPC ........ G06T 7/0002; G06T 2207/30248; H04N 23/80
  See application file for complete search history.

(56) References Cited

U.S. PATENT DOCUMENTS

| | | | |
|---|---|---|---|
| 9,288,376 | B2 | 3/2016 | Walker et al. |
| 9,491,355 | B2 | 11/2016 | Lowell |
| 9,836,484 | B1 | 12/2017 | Bialynicka-Birula et al. |
| 9,836,819 | B1 | 12/2017 | Donsbach et al. |
| 2018/0025392 | A1 | 1/2018 | Helstab |
| 2018/0349114 | A1 | 12/2018 | Brown et al. |
| 2019/0150794 | A1 | 5/2019 | Vrudhula et al. |
| 2020/0167612 | A1 | 5/2020 | Guo et al. |
| 2020/0302029 | A1 | 9/2020 | Holm et al. |
| 2021/0090180 | A1 | 3/2021 | Navarrete et al. |
| 2021/0350470 | A1 | 11/2021 | Lambert et al. |

OTHER PUBLICATIONS

Gamal, Mostafa, Mennatullah Siam, and Moemen Abdel-Razek. "Shuffleseg: Real-time semantic segmentation network." arXiv preprint arXiv:1803.03816 (2018).

Howard, Andrew G., et al. "Mobilenets: Efficient convolutional neural networks for mobile vision applications." arXivpreprint arXiv:1704.04861 (2017).

Milioto, Andres, and Cyrill Stachniss. "Bonnet: An open-source training and deployment framework for semantic segmentation in robotics using cnns." *2019 International Conference on Robotics and Automation (ICRA)*. IEEE (2019).

Zhang, Xiangyu, et al. "Shufflenet: An extremely efficient convolutional neural network for mobile devices." *Proceedings of the IEEE Conference on Computer Vision and Pattern Recognition*, pp. 6848-6856 (2018).

Zhu, Qiuyu, and Ruixin Zhang. "HENet: A Highly Efficient Convolutional Neural Networks Optimized for Accuracy, Speed and Storage." arXiv preprint arXiv:1803.02742 (2018).

"Objects Detection Machine Learning TensorFlow Demo", Amphan, Version 0.2, 2017, <https://play.google.com/store/apps/details?id=org.tensorflow.detect&hl=en_US>, accessed Oct. 31, 2019, 3 pages.

| Label | Precision | Recall | F1 |
|---|---|---|---|
| LF | 0.98 | 0.97 | 0.97 |
| LR | 0.98 | 0.99 | 0.99 |
| RF | 1.00 | 0.99 | 0.99 |
| RF | 1.00 | 0.99 | 1.00 |
| Rear | 0.98 | 0.99 | 0.99 |
| Front | 0.98 | 0.98 | 0.98 |
| Right | 1.00 | 0.99 | 0.99 |
| Left | 0.97 | 1.00 | 0.98 |
| Interior | 0.99 | 0.92 | 0.95 |
| Invoice | 0.99 | 1.00 | 1.00 |
| Odometer | 0.95 | 0.91 | 0.93 |
| VIN | 0.99 | 0.94 | 0.97 |
| License | 0.97 | 0.97 | 0.97 |
| Other | 0.97 | 0.98 | 0.98 |
| Avg | 0.98 | 0.98 | 0.98 |

FIG. 3

SMART IMAGE TAGGING AND SELECTION ON MOBILE DEVICES

CROSS-REFERENCE TO RELATED APPLICATIONS

This application is a continuation and claims the benefit of U.S. patent application Ser. No. 16/670,860 filed Oct. 31, 2019 and entitled "SMART IMAGE TAGGING AND SELECTION ON MOBILE DEVICES," the entire disclosure of which is incorporated herein by reference.

TECHNICAL FIELD

This disclosure relates to optimized image processing systems, methods, and techniques performed by a mobile device, and more particularly, to image processing systems, methods, and techniques that execute exclusively on a mobile device to tag and select images of a vehicle for delivery to a back-end server, e.g., for detecting and evaluating damage that has occurred to the vehicle.

DESCRIPTION OF THE RELATED ART

Typically, to accurately assess damage that has occurred to a vehicle (e.g., to estimate the costs of and/or the parts needed for repairing the vehicle, to provide support for an insurance claim, etc.), an expert appraiser physically walks around a damaged vehicle and manually captures images of the damaged vehicle from various perspectives. Accordingly, this process is both laborious and cost intensive. Furthermore, sets of images of damaged vehicles that are obtained by different appraisers may vary in quality and/or completeness. Several known techniques attempt to address these issues. For example, as described in U.S. Pat. No. 8,712,893, a program executing at a mobile device displays a set of prompts that guide a user to take a desired set photos of a damaged vehicle, such as "photos of the entire vehicle," "photos of the Vehicle Identification Number (VIN)," and "photos of areas of damage." The mobile device sends the photos to a back-end server, which may analyze the photos and provide feedback to the user as to the acceptability of the submitted photos, e.g., whether or not the photos are too blurry, whether or not the photos capture the correct angles to show damage that has occurred, etc., and the back-end server may guide and/or prompt the user to re-take some of the photos. Photos that are deemed to be acceptable are further processed by the back-end server and used in estimating an insurance claim. As such, while this technique prompts a user to capture a complete, needed set of images of a damaged vehicle, the technique still relies on a user to actively capture each of the needed set of images in accordance with the given prompts, and relies on a back-end server to determine the acceptability of the captured photos.

In another example described in U.S. Pat. No. 9,491,355, a program executing at a mobile device presents, on a user interface, a set of graphical indicators indicating the various locations at which a user is to capture images (e.g., "1", "2," "3," etc. that dispersed at different locations around a bird's eye view of a representation of a vehicle). For a given location, the user interface provides a graphical arrow that indicates a direction in and a rate at which the user is to walk around a particular portion of a damaged vehicle and operate the camera of the mobile device to obtain images of the given location. Similar to the aforementioned U.S. Pat. No. 8,712,893, the captured images are sent to a back-end server for review and use in generating an insurance estimate. Thus, this technique also uses graphical indicators of various locations and directions around the vehicle to prompt a user to actively capture each of the needed set of images of a damaged vehicle.

SUMMARY

The present disclosure generally relates to systems, methods, and/or techniques for a mobile device that automatically captures, tags, and selects frames in which a damaged vehicle is depicted, and transmits the selected frames as images to a back-end server, i.e., without any in-line user intervention and without any in-line back-end server guidance. Using the novel systems, methods, and/or techniques disclosed herein, a set of images of sufficient quality and completeness for various back-end image processing purposes (e.g., damage detection, parts ordering, insurance claim estimation, etc.) is automatically captured, tagged, and selected by the mobile device. That is, with the novel and inventive techniques described herein, a user need not explicitly capture the images (e.g., by activating a user control to capture the images), a user need not explicitly tag or label the captured images or be prompted to capture images based on tags or labels, and a user need not explicitly select a subset of images for transmission to the back-end system. The methods, systems, and/or techniques summarized below may include additional, less, or alternate components, functionality, and/or actions, including those discussed elsewhere herein.

In an embodiment, an imaging device, which may be a mobile device, includes a smart image tagging model stored on one or more memories of the imaging device; and also includes a frame processor stored on the one or more memories of the imaging device. The frame processor includes a set of computer-executable instructions that, when executed by one or more processors of the imaging device, cause the imaging device to: obtain a set of frames in which a vehicle is depicted, the set of frames including more than one frame captured by a camera of the imaging device; and input each frame of the set of frames into the smart image tagging model stored on the one or more memories of the imaging device to thereby predict a respective tag associated with the each frame. The respective tag may be indicative of a respective portion or respective parameter of vehicles, and the respective tag is indicated at an output of the smart image tagging model.

The frame processor may further cause the imaging device to select a particular frame, from the set of frames, that corresponds to a particular tag indicative of a particular portion of the vehicle, where the selected frame has a higher level of confidence of depicting the particular portion of the vehicle than respective levels of confidence of other frames, from the set of frames, of depicting the particular portion of the vehicle. The selected, particular frame may be a representative image corresponding to the particular portion of the vehicle indicated by the particular tag, for example. Additionally, the frame processor may cause the imaging device to transmit, from the imaging device via a wireless interface, the representative image and an indication of the particular tag to a back-end server for use in estimating damage to the vehicle, and/or for consumption by other applications.

In an embodiment, a method includes training an initial model by using a first plurality of images. The initial model may utilize depth-wise separable convolutions, pointwise convolutions, residual convolutions, and/or any other suitable types of convolutions, for example. Each image of the first plurality of training images is labeled with a respective corner tag of a set of corner tags, where the set of corner tags is included in a plurality of tags, and each corner tag included in the set of corner tags is indicative of a different vehicle corner. The method also includes, based on weights of the trained, initial model corresponding to the different vehicle corners, re-training the trained, initial model using a second plurality of images labeled with additional tags that are respectively indicative of additional parameters associated with vehicles, where the additional tags are included in the plurality of tags. Additionally, the method includes removing, from the re-trained initial model, one or more nodes that are associated with training and that are not associated with predicting tags, thereby generating a light-weight model configured to receive frames at an input and generate, at an output, predictions of tags that respectively correspond to the received frames and that are included in the plurality of tags. The method further includes serializing the light-weight model to thereby generate a smart image tagging model; and providing the smart image tagging model for storage and utilization at a mobile device, thereby configuring the mobile device to autonomously predict a respective tag associated with each frame that is captured by a camera of the mobile device and input into the smart image tagging model.

In an embodiment, a method at an imaging device, which may be a mobile device, includes storing a smart image tagging model in one or more memories of the imaging device, where the smart image tagging model has been generated by transforming an initial model that utilizes convolutions (e.g., depth-wise separable convolutions, pointwise convolutions, residual convolutions, and/or any other suitable types of convolutions) into a serialized, light-weight model that processes frames of vehicles to thereby predict respective tags associated with the frames, the predicted tags being respectively indicative of different portions of vehicles. The method also includes capturing, by a camera of the imaging device, a set of frames in which a subject vehicle is depicted; and processing, at the imaging device using the smart image tagging model, each frame of the set of frames to thereby predict a respective tag indicative of a respective portion of vehicles and a respective level of confidence of the each frame depicting the respective portion of the subject vehicle, where the predicted respective tags is a plurality of predicted tags. Additionally, the method includes, for each tag of the plurality of predicted tags, selecting, at the imaging device and based on the respective levels of confidence, a respective frame from the set of frames, where the selected, respective frame is a respective, representative image of the subject vehicle corresponding to the each tag; and transmitting, from the imaging device via a wireless interface, the plurality of representative images and indications of the plurality of predicted tags corresponding to the subject vehicle to a back-end server for use in estimating damage to the subject vehicle and/or for consumption by other applications.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals;

FIG. 3 depicts the results of a test version of a smart image tagging model;

DETAILED DESCRIPTION

Figure 1:
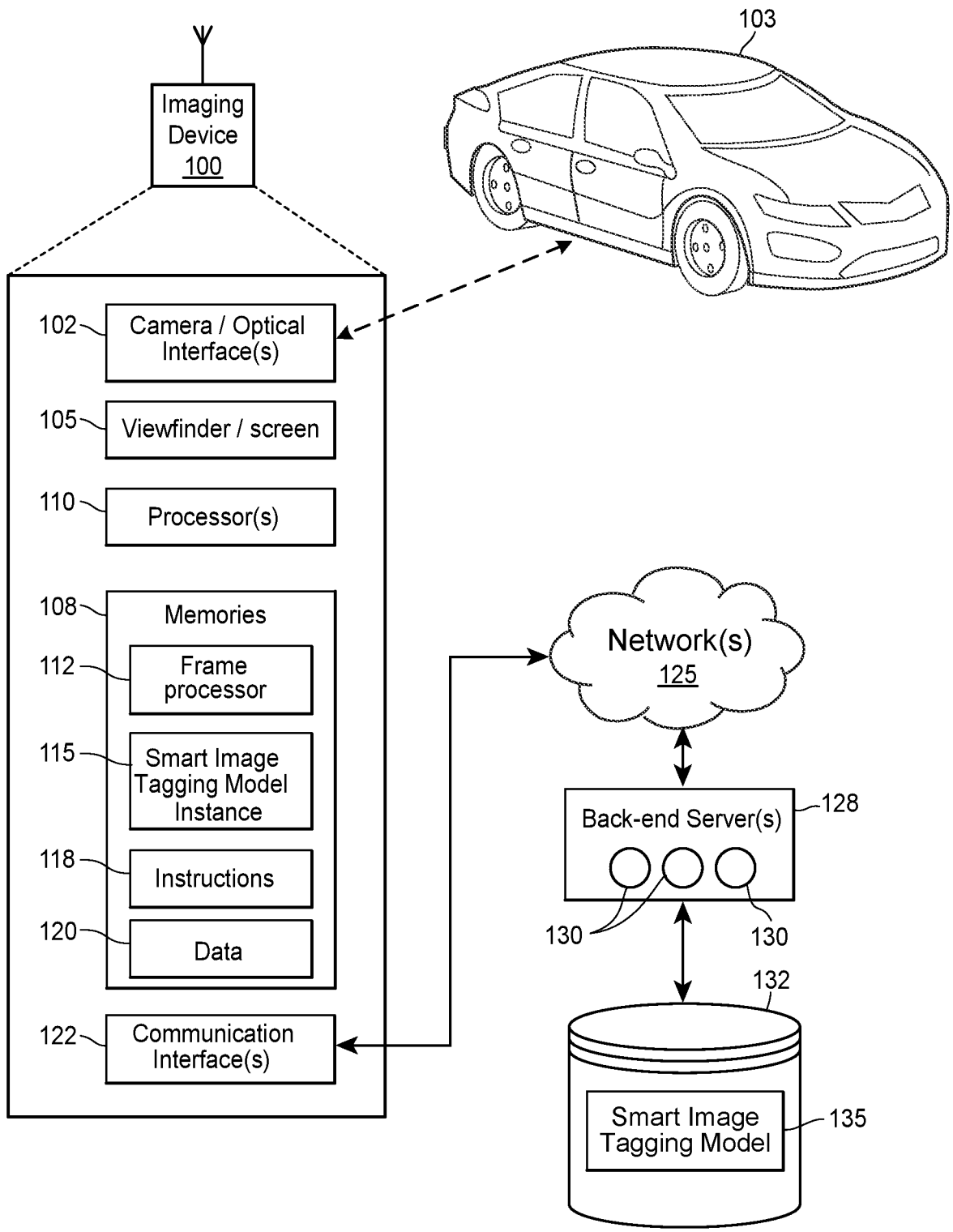
FIG. 1 depicts a block diagram of an example imaging device configured to provide automatic smart image tagging.

FIG. 1 depicts a block diagram of an example imaging device 100 that is configured to provide automatic smart image tagging in accordance with the principles and techniques disclosed herein. The example imaging device 100 includes a camera and/or other optical interface 102 via which frames and images of target subjects (such as the vehicle 103) are obtained and/or captured. Generally, as utilized herein, the term "frame" refers to a still image that is depicted within the boundaries of a viewfinder or screen 105 of the imaging device 100 at a moment in time, and/or that is one of a group of sequentially captured, still images that collectively comprise a video. On the other hand, the term "image," as utilized herein, refers to a single frame that is identified, stored, and/or saved, e.g., as a digital file. Thus, to illustrate using an example scenario, a user may view, via the viewfinder or screen 105 of the imaging device 100, multiple frames that are being captured by the camera 102 as the user pans the camera 102 at and around a target subject 103, and the user may activate a user control (not depicted in FIG. 1) to identify and/or store a particular frame as an image, e.g., locally in one or more memories 108 of the imaging device 100, and/or in a remote data storage location.

The imaging device 100 also includes one or more processors 110 and the one or more memories 108, which may be one or more tangible, non-transitory computer-readable storage media or data storage devices. The one or more memories 108 may store a frame processor 112, an instance of a smart image tagging model 115, and other instructions 118 which are executable by the one or more processors 110. Additionally, the one or more memories 108 may store data 120, which may include, for example, images and/or videos that have been captured by the camera 102, and other data.

As depicted in FIG. 1, the imaging device 100 further includes one or more communication interfaces 122, which may allow the imaging device 100 to communicate with other devices and/or systems, either directly and/or via one or more networks 125. The one or more networks 125 may include any number of wired and/or wireless networks, and may include any number of public and/or private networks. For example, the networks 125 may include a wireless communication or data network, or may include a combination of wired and wireless communication or data networks. Generally, the networks 125 may include any type of communication or data network, such as a Wi-Fi network, a cellular data network, a satellite data network, a public local area network (LAN) and/or wide area network (WAN), a private LAN or WAN, a packet network, the Internet, a Bluetooth connection, other types of direct communication connections, etc. As such, the one or more communication interfaces 122 typically includes at least one wireless communication interface and may include at least one wired communication interface.

The imaging device 100 may be communicatively connected, via the communication interfaces 122 and the one or more networks 125, to one or more back-end servers 128 which execute one or more applications 130 that are consumers of images of damaged vehicles. For example, the imaging device 100 may communicate images and/or other data via the communication interfaces 122 and the one or more networks 125 to the one or more applications 130 at the back-end server(s) 128, which may, in turn, perform additional image processing on images received from the imaging device 100, and/or may perform other types of processing that utilize the received images, such as vehicle damage estimation, parts ordering, insurance estimates, and the like. The one or more back-end server(s) 128 may be implemented using any suitable architecture, such as a bank of servers or computing devices, a client-server architecture, a web services architecture, a cloud-computing system, etc.

The one or more back-end servers 128 include or otherwise have access to a data storage system 132 storing a smart image tagging model 135. The data storage system 132 may be implemented using any suitable architecture, such as, for example, a data bank, a cloud data storage system, etc. In an embodiment, the back-end server(s) 128 may access the data storage system 132 to obtain and provide (e.g., via download or other suitable transfer mechanism) an instance of the smart image tagging model 135 to the imaging device 100 for local storage and utilization, as illustrated by the instance of the smart image tagging model 115 stored in the memories 108 of the imaging device 100, where the instance of the smart image tagging model 115 stored at the imaging device 100 particularly configures the imaging device 100 to perform smart image tagging. Although not shown in FIG. 1, the back-end server(s) 128 may also provide respective instances of the smart image tagging model 135 to other imaging devices.

The imaging device 100 of FIG. 1 may be implemented in various different types of devices, such as laptops, tablets, handhelds or portable devices, cell phones, smart devices, workstations, drones, remotely situated (and, optionally, remotely controlled) cameras or imaging devices, and/or other types of devices. Generally, the imaging device 100 is implemented using a mobile device, such as a smart device, tablet, or cell phone. However, in some embodiments, the imaging device 100 may be implemented using a wired device that has limited or no mobility, such as a camera that is mounted on a track. For ease of discussion and not for limitation purposes, though, the terms "imaging device" and "mobile device" are used interchangeably herein.

Figure 2:
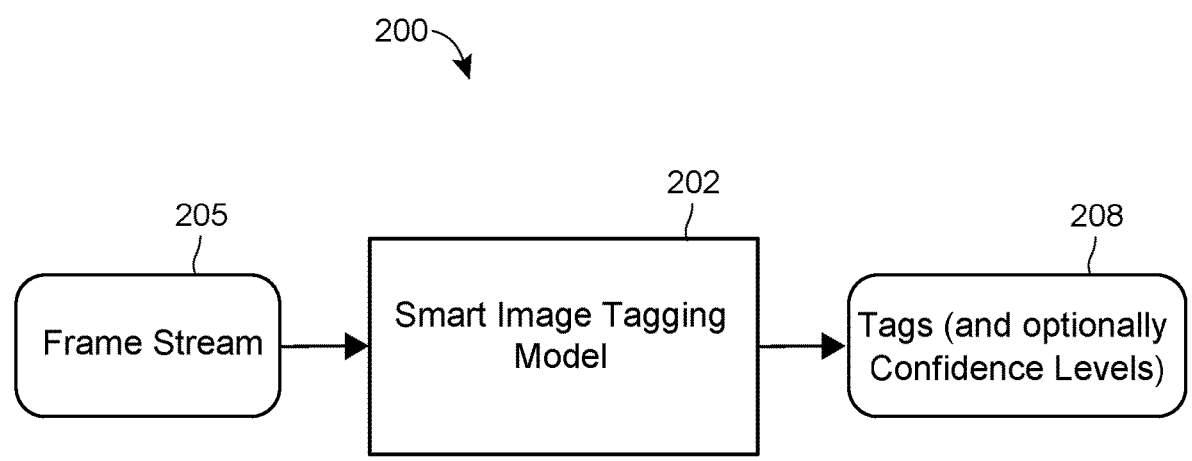
FIG. 2 depicts an example data flow through a smart image tagging model.

FIG. 2 depicts an example data flow 200 through an embodiment of a smart image tagging model 202, such as the instance of the smart image tagging model 115 of FIG. 1. As shown in FIG. 2, a stream of frames 205 in which a vehicle is depicted is provided at an input of the smart image tagging model 202. The stream of frames 205 may be provided to the smart image tagging model 202 in real-time, e.g., as the stream of frames 205 is captured via the camera 102 as a user pans or moves the imaging device 100. Alternatively, the stream of frames 205 may be a stream of frames that was previously captured and is stored in in the memory 108 of the imaging device 100, e.g., a saved video.

The smart image tagging model 202 operates on each frame of the stream 205 to predict a respective tag 208 at an output of the smart image tagging model 202, where the predicted tag 208 identifies a respective parameter associated with the vehicle that is depicted in the frame. Parameters associated with a vehicle that are identified by predicted tags may correspond to various portions of the vehicle, such as the corners of the vehicle (e.g., left front corner, left rear corner, right front corner, right rear corner), and optionally other portions of the exterior and/or interior of the vehicle (e.g., left side, rear bumper, roof, undercarriage, etc.). Additionally, parameters associated with a vehicle that are identified by predicted tags may correspond to other aspects of the vehicle, such as, for example, a VIN number, an odometer reading, a license plate, etc. In some embodiments, parameters associated with a vehicle that are identified by predicted tags may correspond to other information associated with the vehicle, such as, for example, an invoice, an accident report, etc. For some input frames 205, the smart image tagging model 202 may generate more than one respective tag, for example, when the smart image tagging model 202 predicts that more than one parameter of the vehicle is depicted within the input frame 205. In some embodiments, the smart image tagging model 202 may generate a respective level of confidence for each predicted tag. As utilized herein, a "tag" is a categorical identifier which may be implemented using a natural language syntax (e.g., alphanumeric label, annotation, etc.), or may be implemented using a programming language syntax (e.g., parameter, object, class, etc.).

Generally speaking, the smart image tagging model 202 is a light-weight, serialized model that is able to process frames at a rate of at least 5 frames per second. For example, the smart image tagging model 202 may process frames at a rate of at least 5 frames per second, 10 frames per second, 40 frames per second, etc. Further, the smart image tagging model 202 has a size that is less than 20 Megabytes (e.g., less than 20 Megabytes in size, less than 12 Megabytes size, less than 1 Megabyte in size, etc.). As utilized herein, the "size" of the model 202 generally refers to the size of the model 202 itself, and does not account for the size of the framework (e.g., a tensor framework, or other suitable framework) that executes the model 202. However, it is envisioned that in some embodiments, the aggregate size of the model 202 in combination with its framework may be less than 20 Megabytes.

Typically, predictions that are generated by lightweight models (and in particular, that are generated by light-weight models that are sized to operate in real-time on the hardware of a mobile device) are less accurate than predictions generated by non-lightweight models that have been trained for similar purposes and, as such, tradeoffs between model size and accuracy must be made. However, the novel and inventive smart image tagging model 202 is designed to have a high level of precision and recall for its size. For example, known models that have been trained to perform some version of image tagging and that are about 1 Megabyte in size typically have an accuracy of about 70-80%. On the other hand, a test version of an embodiment of the smart image tagging model 202 that is less than 1 Megabyte in size was designed to predict fourteen different tags associated with vehicles (i.e., Left Front corner (LF), Left Rear corner (LR), Right Front corner (RF), Right Rear corner (RR), Rear, Front, Right, Left, Interior, Invoice, Odometer, VIN, License, and Other). This test version was loaded onto and executed by the hardware of a Google Pixel 2 smartphone. As shown in FIG. 3, the results of the test version of the smart image tagging model 202 executing on the Google Pixel 2 smartphone demonstrate an average precision of 98%, an average recall of 98%, and an F1 score (a measure of accuracy which is also referred to as an F-score or an F-measure) of 98%, which is a significant increase over known techniques.

Figure 4:
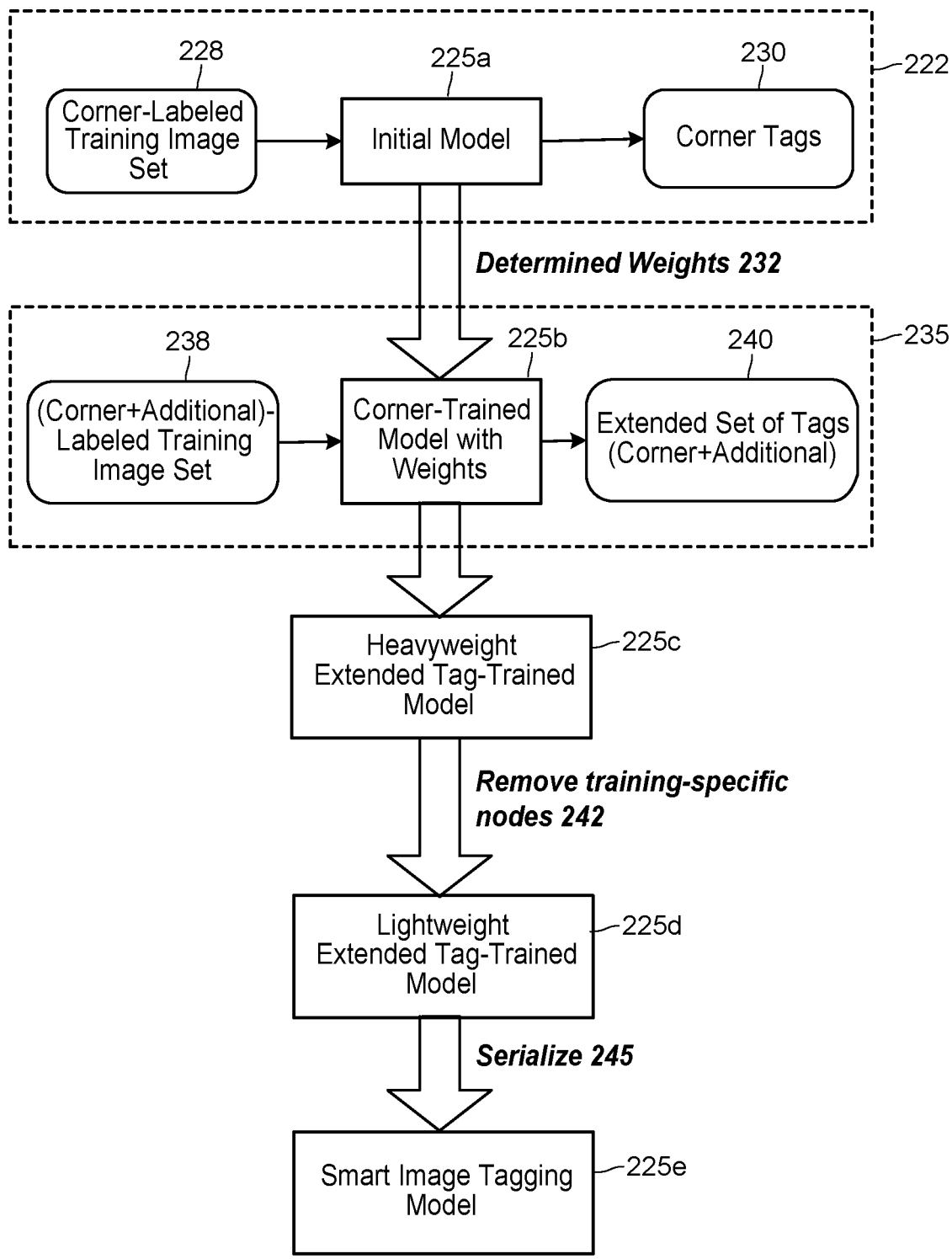
FIG. 4 depicts an example generation of a smart image tagging model.

The smart image tagging model 202 is able to achieve such high levels of accuracy for its size due to the novel and inventive model generation techniques disclosed herein. FIG. 4 illustrates a block diagram that depicts an example model generation technique 220 that produces a smart image tagging model, such as the smart image tagging model 135 or the smart image tagging model 202. The model generation technique 220 includes a first training 222 of an initial model 225a. In an embodiment, the initial model 225a includes a set of deep Convolutional Neural Networks (CNNs) arranged in an architecture that reduces computational complexity, e.g., via the use of depth-wise separable convolutions, pointwise convolutions, residual convolutions, and/or any other suitable types of convolutions, and/or via one or more other suitable techniques. For example, the initial model 225a may include techniques utilized in the MobileNet architecture described in "Mobilenets: Efficient convolutional neural networks for mobile vision applications," Howard, Andrew G., et al., *arXiv preprint arXiv:* 1704.04861 (2017); the ShuffleNet architecture described in "Shufflenet: An extremely efficient convolutional neural network for mobile devices," Zhang, Xiangyu, et al., *Proceedings of the IEEE Conference on Computer Vision and Pattern Recognition*, pp. 6848-6856, 2018; the HENet architecture described in "HENet: A Highly Efficient Convolutional Neural Networks Optimized for Accuracy, Speed and Storage," Zhu, Qiuyu, and Ruixin Zhang, *arXiv preprint arXiv:*1803.02742 (2018); the EffNet architecture described in "Effnet: An efficient structure for convolutional neural networks," Freeman, Ido, Lutz Roese-Koerner, and Anton Kummert, 2018 *25th IEEE International Conference on Image Processing (ICIP)*. IEEE, 2018; and/or the ShuffleSeg architecture described in "Shuffleseg: Real-time semantic segmentation network," Gamal, Mostafa, Mennatullah Siam, and Moemen Abdel-Razek, *arXiv preprint arXiv:* 1803.03816 (2018). In a non-limiting embodiment, the initial model 225a may utilize one or more depth-wise separable convolutions, e.g., for the purposes of computational gain, if desired.

At any rate, the initial model 225a is first trained 222 using a first set of images of vehicles 228, each of which is labeled with one or more tags of a set of corner tags that identify respective corners of a vehicle depicted therein. For example, the set of corner tags may identify four corners of vehicles (e.g., LF, LR, RF, RR), eight corners of vehicles (e.g., Left Front Top, Left Front Bottom, Left Rear Top, Left Rear Bottom, Right Front Top, Right Front Bottom, Right Rear Top, Right Rear Bottom), or any desired set of corner tags. The vehicles depicted in the corner-labeled training images 228 include vehicles of different makes, models, years or year-ranges, and that have different degrees and/or locations of damage. For example, in the test version of the smart image tagging model 202 discussed with respect to FIG. 3, the initial model 225a from which the model 202 was generated included aspects of the MobileNet architecture, and was first trained on a first set of 500,000 images that were labeled with tags corresponding to four corners of vehicles, e.g., LF, LR, RF, and RR. Accordingly, as shown in FIG. 4, the initial model 225a is trained to predict the set of corner tags 230 using a set of associated weights 232 that are determined from the first training 222 and that correspond to the set of corner tags 230. Said another way, the initial model 225a is trained to classify angles or ranges of angles from which subject vehicles are viewed in accordance with the set of corner tags 230. FIG. 4 depicts the first trained, initial model 225a as the corner-trained model with weights 225b.

As further depicted in FIG. 4, the model generation technique 220 includes a second, re-training 235 of the corner-trained model with weights 225b using a second set of images 238. Each image of the second set of training images 238 is labeled with one or more tags from an extended set of tags, where the extended set of tags includes the set of corner tags and one or more additional tags. The vehicles depicted in the second set of images 235 labeled with the extended set of tags include vehicles of different makes, models, years or year-ranges, and that have different degrees and/or locations of damage. For example, in the test version of the smart image tagging model 202 discussed with respect to FIG. 3, the corner-trained model with weights 225b was re-trained using a second set of images that were labeled with the tags corresponding to four corners of vehicles (e.g., LF, LR, RF, RR) and ten additional tags (i.e., Rear, Front, Right, Left, Interior, Invoice, Odometer, VIN, License, and Other), where the second set of images included at least 1000 respective images for each of the fourteen tags. Accordingly, via the re-training 232, the corner-trained model with weights 225b is trained to predict the extended set of tags 238. FIG. 4 depicts the re-trained, corner-trained model with weights 225b as the heavyweight extended tag-trained model 225c.

The model generation technique 220 further includes removing one or more training-specific nodes 242 from the heavyweight, extended tag-trained model 225c, thus optimizing the model 225c for inference. For example, one or more nodes that are specific to training and that are not utilized during tag prediction may be removed 242 from the heavyweight extend tag-trained model 225c. In an embodiment, all nodes that are not utilized during tag prediction are removed from the heavyweight extend tag-trained model 225c. Removed nodes may include, for example, optimizer nodes, loss calculation nodes, loss value nodes, and other types of nodes. FIG. 4 depicts the heavyweight extended tag-trained model 225c from which training-specific nodes and/or nodes that are not utilized for tag predictions have been removed 242 as the lightweight extended tag-trained model 225d.

Additionally, the model generation technique 220 includes serializing 245 the lightweight extended tag-trained model 225d. Serialization 245 may be based on the input and output of the model 225d, and may result in a binary, compact version 225e of the lightweight, extended tag-trained model 225d, where the binary, compact version 225e is the resulting smart image tagging model generated by the model generation technique 220 based on the initial model 225a. For example, the resulting smart image tagging model may be the model 135 of FIG. 1 or the model 202 of FIG. 2. In an embodiment, the resulting smart image tagging model 225e includes only nodes that are utilized for tag prediction, and excludes any other nodes and/or parameters that are not utilized for tag prediction. As such, the smart image tagging model 225e produced by the model generation technique 220 is typically less than 1 Megabyte in size, and is typically able to process a stream of frames to predict respective, associated tags at a rate of at least 40 frames per second and with a general accuracy of at least 98%.

Figure 5:
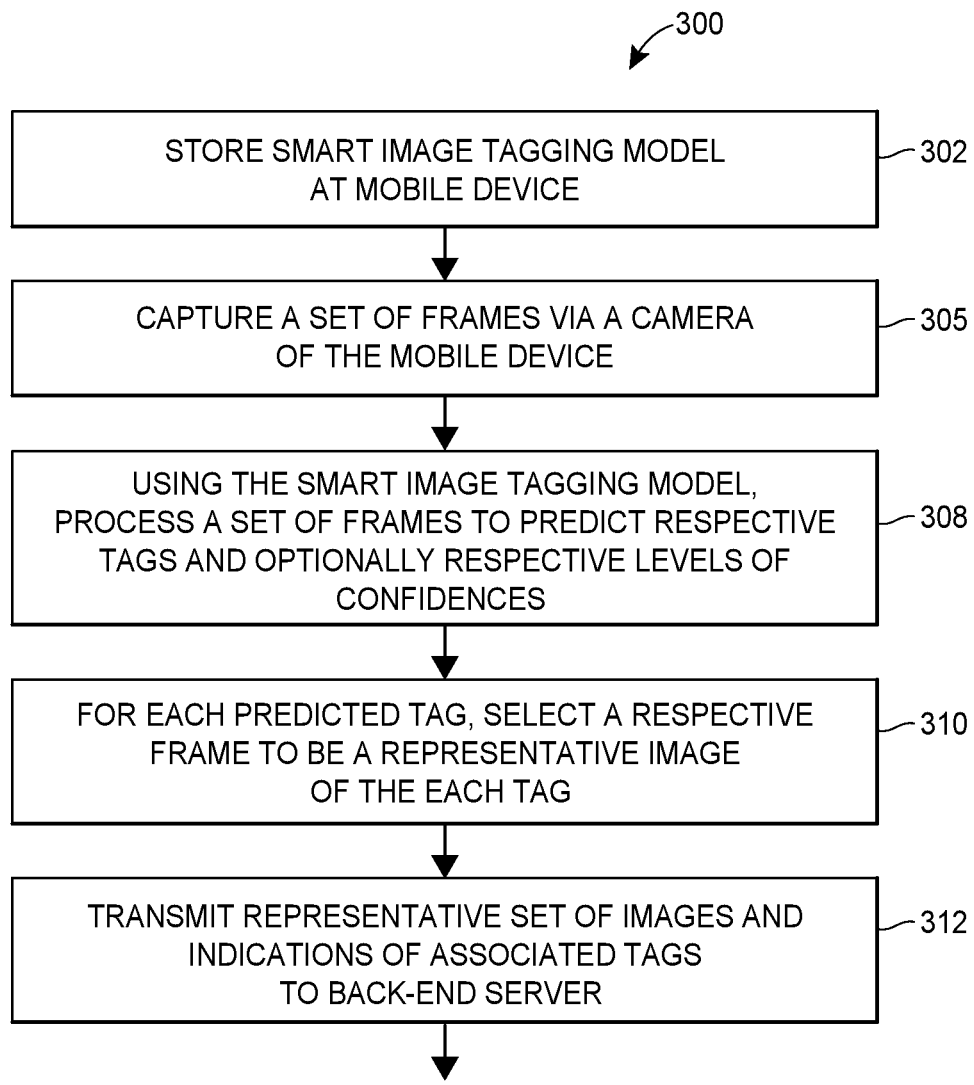
FIG. 5 depicts a flow diagram of an example method of smart image tagging.

FIG. 5 depicts a flow diagram of an example method 300 of smart image tagging at an imaging device, which may be a mobile device. In an embodiment, at least a portion of the method 300 may be executed by the imaging or mobile device 100 of FIG. 1, such as by utilizing the frame processor 112 and/or the smart image tagging model instance 115 of the device 100. Of course, devices other than the imaging or mobile device 100 may execute the method 300. Further, in embodiments, the method 300 may include additional, less, or alternate functionality than that discussed with respect to FIG. 5, including that discussed elsewhere herein. For ease of discussion, and not for limitation purposes, the method 300 is discussed below with simultaneous reference to FIGS. 1-4.

At a block 302, the method 300 includes storing a smart image tagging model in one or more memories of the imaging device. The smart image tagging model may have been generated by transforming an initial model that utilizes convolutions (e.g., pointwise, residual block, depth-wise separable, and/or any other suitable types of convolution) into a serialized, light-weight model that processes frames of vehicles to thereby predict respective tags associated with the frames, where the predicted tags are respectively indicative of different portions and/or parameters of vehicles depicted in the frames. Optionally, the smart image tagging model may also generate, for each predicted tag associated with each frame, a respective level of confidence of the each frame depicting the portion or parameter of vehicles indicated by the each predicted tag. The smart image tagging model may have a size of less than 1 Megabyte, for example. In some embodiments, the smart image tagging model may have been generated by using the model generation technique 220 of FIG. 4. For example, one or more back-end servers 128 may utilize the model generation technique 220 to generate the smart image tagging model 135, and may store the generated model 135 in an accessible data storage device 132. The one or more back-end servers 128 may provide an instance of the smart image tagging model 135 to the imaging device 100, e.g., via one or more networks 125 and a communication interface 122 of the imaging device, and the imaging device 100 may store the instance of the smart image tagging model 115 in its memories 108 (block 302).

At a block 305, the method 300 includes capturing, by a camera of the imaging device, a set of frames in which a vehicle is depicted, e.g., a subject vehicle. For example, the set of frames may be captured by the camera of the imaging device and displayed via the screen or viewfinder of the imaging device as a user walks around the vehicle while aiming or pointing the camera of the imaging device towards the vehicle. That is, the set of frames includes frames that are captured from multiple angles and/or multiple ranges of angles relative to the vehicle, e.g., as the user walks around the vehicle. In some scenarios, the block 305 includes receiving an indication of a user activation of a user control, and based on the user control activation, storing the captured set of frames at the imaging device, e.g., as individual still images, or as a video. In other scenarios, the block 305 excludes receiving any indication of the user activating any user control to explicitly store any of the captured frames at the imaging device. That is, while the camera of the imaging device may be capturing the set of frames and presenting the set of frames in real-time at the display or viewfinder, the user does not explicitly indicate that any of the captured frames are to be stored at the imaging device.

At a block 308, the method 300 includes processing, at the imaging device using the locally stored smart image tagging model, each frame of the set of frames to thereby predict a respective tag that is indicative of a respective portion of vehicles or of another respective parameter associated with the vehicles. For example, the frame processor 112 of the imaging device 100 may process each frame of the set of frames, e.g., by inputting each frame into the smart image tagging model instance 115 to thereby predict one or more tags associated with the each frame. In an example scenario, processing the set of frames 308 may be performed in real-time, e.g., as the set of frames are captured 305 by the imaging device 100. For instance, the processing of the set of frames 308 may be performed at a rate of at least 40 frames per second. In another example scenario, the set of frames may have been saved or stored a priori at the imaging device 100, and the processing the set of frames 308 includes processing the stored set of frames. At any rate, during the processing 308 of the set of frames, the smart image tagging model instance 115 may predict, for each frame, one or more tags, where the predicted tags may be indicative of parameters that correspond to portions of the subject vehicle, to other aspects of the subject vehicle, and/or to other information associated with the subject vehicle, such as described above. In some embodiments, for each predicted tag, the smart image tagging model instance 115 further provides a respective level of confidence of the each frame depicting the respective vehicle portion or parameter corresponding to each predicted tag.

At a block 310, the method 300 includes, for each tag of a plurality of tags, selecting, at the imaging device, a respective frame from the set of frames. For example, the frame processor 112 of the imaging device 100 may select a respective frame for each different tag that has been predicted by the smart image tagging model instance 115 to be associated with the set of frames. As such, the selecting 300 is based on the set of predicted tags and optionally may be also based on the respective levels of confidence associated with the predicted tags.

To illustrate, in an example scenario, the smart image tagging model instance 115 processes a set of 100 frames of a damaged vehicle, and determines that 20 of the 100 frames likely depict the left rear corner of the damaged vehicle. For each of the 20 frames, the smart image tagging model instance 115 labels the subject frame with the tag "LR" and generates an associated level of confidence of the subject frame indeed depicting the left rear corner of the damaged vehicle. The frame processor 112 may select a particular frame from the 20 frames that have been labeled with "LR" to be the representative image, from the set of 100 frames, corresponding to the tag "LR." For example, the frame processor 112 may select the particular frame from the 20 "LR"-labeled frames that has the highest associated level of confidence of depicting the left rear corner of the damaged vehicle therein to be the representative frame corresponding to the tag "LR." The respective, selected frame for each tag may be identified as a representative image of the each tag, and may be stored in the memory 108 of the imaging device 100.

In another example scenario, the smart image tagging model instance 115 may process the set of 100 frames of the damaged vehicle until it determines that a particular frame is associated with the tag "LR" and has a respective level of confidence level over a threshold. In this example scenario, said particular frame may be identified as the representative image of the tag "LR." That, the first frame that is predicted to be associated with the tag "LR" at or above the threshold level of confidence is identified to be the representative image of the tag "LR."

In some embodiments of the block 308, the method 300 may include determining that none of the frames of the set of input frames has been predicted to be associated with a particular predicted tag from the set of predictable tags. For example, if the smart image tagging model 115 is able to predict fourteen different tags, the method 300 may determine that none of the input set of frames have been tagged with Tag 3. Alternatively, the method 300 may include determining that none of the frames associated with a particular predicted tag is suitable. For example, the method 300 may determine that confidence level of the frame having the highest level of confidence among the frames corresponding to a particular predicted tag (e.g., Tag 3) does not meet a threshold. In these embodiments, the method 300 may include adjusting the angle of the camera with respect to the subject vehicle (not shown in FIG. 5) to increase the probability of capturing another frame corresponding to the particular tag (e.g., Tag 3) that has a respective level of confidence higher than the threshold. Adjusting the angle of the camera may include, for example, automatically adjusting the angle of capture by commanding the imaging device to move to another spatial location and/or orientation, such as when the imaging device is included in a drone. In another example, adjusting the angle of the camera may include guiding and/or directing the user or another computing device to move the camera to a suitable spatial location and/or orientation, such as by displaying visual prompts and or guides on the screen 105, and/or by transmitting instructions. At any rate, upon adjusting the angle of the camera, the method 300 may repeat blocks 305 and 308 (in some situations, with further additional camera adjustments), until the processing 308 determines that a newly captured frame corresponding to the particular tag (e.g., Tag 3) is above the threshold. This newly captured frame may be selected and identified (block 310) to be the representative image of the particular tag (e.g., of Tag 3).

At a block 312, the method 300 includes transmitting, from the imaging device via a wireless interface, the selected plurality of representative images and indications of the corresponding tags to a back-end server, e.g., for additional image processing, for use in estimating damage to the vehicle, for determining repairs and/or replacement parts, for estimating insurance claims, etc. For example, the imaging device 100 may transmit, via a wireless communication interface 122, the selected, representative images of the plurality of predicted tags to the back-end server(s) 128, and one or more applications 130 at the back-end servers 128 may further image process the representative images, and/or may utilize the received, representative images to determine types, extents, and/or locations of damage to the vehicle, parts of the vehicle that need to be repaired and/or replaced and associated costs, estimates of insurance claim costs, etc. The selected, plurality of representative images may include images that have been captured among a variety of different ranges of angles between the camera and the subject vehicle, such as while the camera moves around the vehicle.

Thus, the novel and inventive smart image tagging systems, methods, and techniques described herein provide numerous advantages over known techniques. Significantly, intelligent or smart tagging of frames and/or images is able to be performed autonomously and exclusively at an imaging device, such as a mobile device, without using any in-line human input or intervention, without using any in-line back-end server input or intervention, and in a manner that has demonstrated to be more accurate than is able to be provided by models of a comparable size. As described above, imaging devices that are configured to perform smart image tagging are able to automatically perform a frame by frame analysis (e.g., as the camera is panned) to determine respective tags, and, based on the frame by frame analysis, automatically select, capture, store, and transmit the most suitable frame for each respective tag, e.g., so that back-end applications may operate on high quality images with more accuracy and efficiency for purposes such as damage detection and claim appraisal.

It is further noted that although the present disclosure is discussed with respect to tagging and selecting images of vehicles, any of the systems, methods, and/or techniques described herein may be easily applied to other types of target objects, e.g., so that image processing, tagging, capture, and selection may be performed automatically and autonomously at imaging devices, such as mobile devices, without any in-line human input and/or without any in-line back-end server input. For example, any of the systems, methods, and/or techniques described herein may be easily applied to other types of target objects such as buildings, real property, and/or other types of structures, items, and objects.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. An imaging device that includes a smart image tagging model and a frame processor stored on one or more memories of the imaging device. The frame processor includes a set of computer-executable instructions that, when executed by one or more processors of the imaging device, cause the imaging device to obtain a set of frames in which a vehicle is depicted, the set of frames including more than one frame captured by a camera of the imaging device, and input each frame of the set of frames into the smart image tagging model to thereby predict a respective tag associated with the each frame. The respective tag is indicative of a respective portion of vehicles, and the respective tag is indicated at an output of the smart image tagging model.

The frame processor is further executable to cause the imaging device to select a particular frame, from the set of frames, that corresponds to a particular tag indicative of a particular portion of the vehicle. The selected frame corresponding to the particular tag has a higher level of confidence of depicting the particular portion of the vehicle corresponding to the particular tag than the respective levels of confidence of other frames, from the set of frames, of depicting the particular portion of the vehicle corresponding to the particular portion of the vehicle. Additionally, the selected, particular frame may be a representative image corresponding to the particular portion of the vehicle indicated by the particular tag. Additionally, the frame processor is executable to cause the imaging device to transmit, from the imaging device via a wireless interface, the representative image and an indication of the particular tag to a back-end server for use in estimating damage to the vehicle.

2. The imaging device of the preceding aspect, wherein the set of frames includes a stream of frames captured by the camera of the imaging device.

3. The imaging device of any one of the preceding aspects, wherein the stream of frames is captured by the camera of the imaging device across a plurality of ranges of angles relative to the vehicle, the plurality of ranges of angles including a particular range of angles corresponding to the particular portion of the vehicle.

4. The imaging device of any one of the preceding aspects, wherein the frame processor obtains and inputs each frame of the stream of frames into the smart image tagging model upon capture of the each frame by the camera of the imaging device.

5. The imaging device of any one of the preceding aspects, wherein the smart image tagging model processes input frames at a rate of at least 5 frames per second or faster, e.g., at a rate of at least 10 frames per second, at least 20 frames per second, at least 40 frames per second, etc.

6. The imaging device of any one of the preceding aspects, wherein a size of the smart image tagging model stored in the one or more memories of the imaging device is less than 20 Megabytes (e.g., less than 20 Megabytes, less than 12 Megabytes, less than 5 Megabytes, less than 1 Megabyte, etc.).

7. The mobile of device of any one of the preceding aspects, wherein the smart image tagging model has been generated by: (i) first training an initial model by using a first plurality of images, each image of the first plurality of images labeled with a respective corner tag of a set of different corner tags respectively indicative of different vehicle corners, and the initial model being a model that utilizes convolutions.

8. The imaging device of the preceding aspect, wherein the smart image tagging model has been generated further by (ii) subsequent to the first training, re-training the trained, initial model by using a set of weights corresponding to the different vehicle corners and a second plurality of images labeled with additional tags respectively indicative of additional parameters associated with vehicles, the set of weights corresponding to the different vehicle corners determined based on the first training.

9. The imaging device of the preceding aspect, wherein the smart image tagging model has been generated further by (iii) removing, from the re-trained initial model, one or more nodes that are training-specific and that are not used in predicting tags, the one or more training-specific nodes including at least one of: an optimizer node, a loss calculation node, a loss value node, or another type of node that is not used in predicting tags.

10. The imaging device of the preceding aspect, wherein the smart image tagging model has been generated further by (iv) serializing the re-trained initial model from which the one or more training-specific nodes have been removed.

11. The imaging device of any one of the preceding aspects, wherein the particular tag indicative of the particular portion of the vehicle is included in a plurality of tags, and the plurality of tags includes the set of different corner tags and the additional tags.

12. The imaging device of any one of the preceding aspects, wherein the additional tags include respective tags indicative of one or more of: an interior of vehicles, an odometer reading, a VIN number, a license plate, or an invoice.

13. The imaging device of any one of the preceding aspects, wherein the particular tag is included in a plurality of tags, each of which is indicative of a different portion or parameter associated with vehicles, and wherein the frame processor further causes the imaging device to: based on outputs generated by the smart image tagging model operating on the set of frames, for each tag of the plurality of tags, select a respective frame of the set of frames that corresponds to the each tag, the selected, respective frame being a respective representative image corresponding to the each tag; and transmit, from the imaging device via the wireless interface, the plurality of representative images and indications of the corresponding plurality of tags to the back-end server for use in estimating damage to the vehicle.

14. The imaging device of any one of the preceding aspects, wherein the imaging device is a mobile device.

15. A method includes training an initial model by using a first plurality of images, the initial model utilizing convolutions, where each image of the first plurality of images is labeled with a respective corner tag of a set of corner tags, the set of corner tags included in a plurality of tags, and each corner tag included in the set of corner tags indicative of a different vehicle corner. The method also includes, based on weights of the trained, initial model corresponding to the different vehicle corners, re-training the trained, initial model using a second plurality of images labeled with additional tags that are respectively indicative of additional parameters associated with vehicles, where the additional tags are included in the plurality of tags. The method further includes removing, from the re-trained initial model, one or more nodes that are associated with training and that are not associated with predicting tags, thereby generating a light-weight model configured to receive frames at an input and generate, at an output, predictions of tags that respectively correspond to the received frames and that are included in the plurality of tags, and serializing the light-weight model to thereby generate a smart image tagging model. Additionally, the method includes providing the smart image tagging model for storage and utilization at a mobile device, thereby configuring the mobile device to autonomously predict a respective tag associated with each frame that is captured by a camera of the mobile device and input into the smart image tagging model.

16. The method of the preceding aspect, wherein the light-weight model is configured further to generate, at the output, respective levels of confidence corresponding to predicted tags; and wherein providing the smart image tagging model for storage and utilization at the mobile device thereby further configures the mobile device to select, from a group of frames predicted by the smart image tagging model to be associated with a particular tag, a particular frame that has a higher level of confidence of depicting a respective parameter indicated by the particular tag than respective levels of confidence of other frames, within the group of frames, of respectively depicting the respective parameter, where the respective parameter is associated with the vehicle.

17. The method of any one of aspects 15-16, wherein providing the smart image tagging model for storage and utilization at the mobile device comprises providing, for storage and utilization at the mobile device, a smart image tagging model that processes frames at a rate of at least 5 frames per second, e.g., at a rate of at least 10 frames per second, at least 20 frames per second, at least 40 frames per second, etc.

18. The method of any one of aspects 15-17, wherein a size of the smart image tagging model stored at the mobile device is less than 20 Megabytes (e.g., less than 20 Megabytes, less than 12 Megabytes, less than 5 Megabytes, less than 1 Megabyte, etc.).

19. The method of any one of aspects 15-18, wherein re-training the trained, initial model using the second plurality of images labeled with the additional tags that are respectively indicative of the additional parameters associated with vehicles comprises re-training the trained, initial model using the second plurality of images labeled with respective tags indicative of at least one of: an interior of vehicles, an odometer reading, a VIN number, a license plate, or an invoice.

20. A method at a mobile device includes storing a smart image tagging model in one or more memories of the mobile device, where the smart image tagging model has been generated by transforming an initial model that utilizes convolutions into a serialized, light-weight model that processes frames of vehicles to thereby predict respective tags associated with the frames, the predicted tags being respectively indicative of different portions of vehicles. The method also includes capturing, by a camera of the mobile device, a set of frames in which a subject vehicle is depicted; and processing, at the mobile device using the smart image tagging model, each frame of the set of frames to thereby predict a respective tag indicative of a respective portion of vehicles and a respective level of confidence of the each frame depicting the respective portion of the subject vehicle, where the predicted respective tags are a plurality of predicted tags. Additionally, the method includes, for each tag of the plurality of predicted tags, selecting, at the mobile device and based on the respective levels of confidence, a respective frame from the set of frames, where the selected, respective frame is a respective, representative image of the subject vehicle corresponding to the each tag; and transmitting, from the mobile device via a wireless interface, the plurality of representative images and indications of the plurality of predicted tags corresponding to the subject vehicle to a back-end server for use in estimating damage to the subject vehicle.

21. The method of the preceding aspect, wherein the smart image tagging model has been generated by:

(i) first training the initial model by using a first plurality of images, each image of the first plurality of images labeled with a respective corner tag of a set of different corner tags respectively indicative of different vehicle corners, and the initial model being a model that utilizes convolutions;

(ii) subsequent to the first training, re-training the trained, initial model by using a set of weights corresponding to the different vehicle corners and a second plurality of images labeled with additional tags respectively indicative of additional parameters associated with vehicles, the set of weights corresponding to the different vehicle corners determined based on the first training;

(iii) removing, from the re-trained initial model, one or more nodes that are training-specific and that are not used in predicting tags, the one or more training-specific nodes including at least one of: an optimizer node, a loss calculation node, or a loss value node, or another type of node that is not used in predicting tags; and (iv) serializing the re-trained initial model from which the one or more training-specific nodes have been removed, thereby generating the smart image tagging model.

22. The method of the preceding aspect, wherein the plurality of predicted tags corresponding to the set of frames includes at least one of the additional tags.

23. The method of any one of aspects 20-22, wherein processing the each frame of the set of frames includes processing the each frame of the set of frames as the each frame is captured by the camera of the mobile device.

24. The method of any one of aspects 20-23, wherein at least one of: storing the smart image tagging model in the one or more memories of the mobile device includes storing a smart image tagging model having a size less than 20 Megabytes (e.g., less than 20 Megabytes, less than 12 Megabytes, less than 5 Megabytes, less than 1 Megabyte, etc.) in the one or more memories of the mobile device; or processing the each frame of the set of frames includes processing the each frame of the set of frames at a rate of at least 5 frames per second, e.g., at least 10 frames per second, at least 20 frames per second, at least 40 frames per second, etc.

25. The method of any one of aspects 20-24, wherein capturing the set of frames of the subject vehicle includes capturing a respective plurality of frames at each range of angles of a plurality of ranges of angles that are relative to the subject vehicle; and transmitting, to the back-end server, the selected plurality of images corresponding to the plurality of tags includes transmitting, to the back-end server, a set of images corresponding to the plurality of tags and captured at different ranges of angles relative to the subject vehicle.

26. Any one of the previous aspects in combination with any other one of the previous aspects.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory, tangible, machine-readable medium) or hardware modules. A hardware module is tangible unit capable of performing certain operations and may be configured or arranged in a certain manner. In example embodiments, one or more computer systems (e.g., a standalone, client or server computer system, cloud computing system, etc.) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a university complex, an office environment, or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the change detection techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrange-

What is claimed:

1. A mobile device, comprising:
a frame processor stored on the one or more memories of the mobile device, the frame processor comprising a set of computer-executable instructions that, when executed by one or more processors of the mobile device, cause the mobile device to:
select, from a set of frames that depict a vehicle and that correspond to a particular tag indicative of a particular portion or parameter of the vehicle, a particular frame that has a higher level of confidence of depicting the particular portion or parameter of the vehicle than respective levels of confidence of other frames, from the set of frames, of depicting the particular portion or parameter of the vehicle, the particular tag and the respective levels of confidence of the set of frames generated by a smart image tagging model stored on the one or more memories of the mobile device and operating on the set of frames; and
transmit, from the mobile device via a wireless interface, the selected frame and an indication of the particular tag to a back-end server for use in estimating damage to the vehicle.

2. The mobile device of claim 1, wherein the set of frames includes a stream of frames captured by a camera of the mobile device.

3. The mobile device of claim 2, wherein at least one of:
the stream of frames is captured by the camera of the mobile device across a plurality of ranges of angles relative to the vehicle; or
the frame processor inputs each frame of the stream of frames into the smart image tagging model upon capture of the each frame by the camera of the mobile device.

4. The mobile device of claim 1, wherein the smart image tagging model is a serialized, light-weight model that at least one of: processes input frames at a rate of at least 5 frames per second or has a size of less than 20 Megabytes.

5. The mobile device of claim 1, wherein the particular tag is included in a plurality of tags, each of which is indicative of a different portion or parameter associated with vehicles, the set of frames is a subset of a plurality of frames in which the vehicle is depicted, and wherein the frame processor further causes the mobile device to:
based on outputs generated by the smart image tagging model operating on the plurality of frames, and for each tag of more than one tag of the plurality of tags, select, from the plurality of frames, a respective frame that corresponds to the each tag, the selected, respective frame being a respective representative image corresponding to the each tag, and the selection of the respective frame based on a level of confidence corresponding to the respective frame and the each tag; and
transmit, from the mobile device via the wireless interface, the plurality of representative images and indications of the corresponding tags to the back-end server for use in estimating damage to the vehicle.

6. The mobile device of claim 5, wherein the frame processor further causes the mobile device to:
subsequent to the smart image tagging model operating on the plurality of frames, determine that the outputs generated by the smart image tagging model exclude a specific tag of the plurality of tags, the specific tag indicative of a specific portion or parameter of the vehicle; and
based on the determination, cause an angle of a camera of the mobile device to be adjusted for capturing an image of the specific portion or parameter of the vehicle.

7. The mobile device of claim 1, wherein the particular tag is a first tag indicative of a first portion or parameter of the vehicle, the set of frames is a first set of frames, and the frame processor further causes the mobile device to:
determine, for a second set of frames that have been operated on by the smart image tagging model and that correspond to a second tag indicative of a second portion or parameter of the vehicle, that none of respective levels of confidence of the second set of frames depicting the second portion or parameter of the vehicle exceeds a threshold; and
based on the determination, causing an angle of a camera of the mobile device to be adjusted for capturing another image of the second portion or parameter of the vehicle.

8. A method at a mobile device, the method comprising:
selecting, by the mobile device from a set of frames that depict a vehicle and that correspond to a particular tag indicative of a particular portion or parameter of the vehicle, a particular frame that has a higher level of confidence of depicting the particular portion or parameter of the vehicle than respective levels of confidence of other frames, from the set of frames, of depicting the particular portion or parameter of the vehicle, the particular tag and the respective levels of confidence of the set of frames generated by a smart image tagging model stored on the one or more memories of the mobile device and operating on the set of frames; and
transmitting, from the mobile device via a wireless interface, the selected frame and an indication of the particular tag to a back-end server for use in estimating damage to the vehicle.

9. The method of claim 8, further comprising capturing, by a camera of the mobile device, a stream of frames, and wherein the set of frames includes the stream of frames.

10. The method of claim 9, wherein at least one of:
capturing the stream of frames includes capturing a stream of frames across a plurality of ranges of angles of the camera relative to the vehicle; or
upon capture of each frame of the stream of frames, inputting the each frame into the smart image tagging model.

11. The method of claim 8, wherein the smart image tagging model is a serialized, light-weight model that at least one of: processes input frames at a rate of at least 5 frames per second or has a size of less than 20 Megabytes.

12. The method of claim 8, wherein the particular tag is included in a plurality of tags, each of which is indicative of a different portion or parameter associated with vehicles, the set of frames is a subset of a plurality of frames in which the vehicle is depicted, and the method further comprises:
based on outputs generated by the smart image tagging model operating on the plurality of frames, for each tag of more than one tag of the plurality of tags, selecting, by the mobile device, a respective frame that corresponds to the each tag, the selected, respective frame being a respective representative image corresponding to the each tag, and the selecting of the respective frame based on a level of confidence corresponding to the respective frame and the each tag; and transmitting, by the mobile device via the wireless interface, the plurality of representative images and indications of the corresponding tags to the back-end server for use in estimating damage to the vehicle.

13. The method of claim 12, further comprising:
subsequent to the smart image tagging model operating on the plurality of frames, determining that an entirety of a set of outputs generated by the smart image tagging model and corresponding to the plurality of frames excludes a specific tag of the plurality of tags, the specific tag indicative of a specific portion or parameter of the vehicle; and
based on the determination, causing an angle of a camera of the mobile device to be adjusted for capturing an image of the specific portion or parameter of the vehicle.

14. The method of claim 13, wherein causing the angle of the camera of the mobile device to be adjusted includes at least one of:
automatically adjusting a spatial orientation of at least one of the mobile device or the camera of the mobile device with respect to the vehicle; or
instructing, via one or more user interfaces of the mobile device, a user of the mobile device to adjust the spatial orientation of the at least one of the mobile device or the camera of the mobile device with respect to the vehicle.

15. The method of claim 8, wherein the particular tag is a first tag indicative of a first portion or parameter of the vehicle, the set of frames is a first set of frames, and method further comprises:
determining, by the mobile device for a second set of frames that have been operated on by the smart image tagging model and that correspond to a second tag indicative of a second portion or parameter of the vehicle, that none of respective levels of confidence of the second set of frames depicting the second portion or parameter of the vehicle and generated by the smart image tagging model exceeds a threshold; and
based on the determination, causing an angle of a camera of the mobile device to be adjusted for capturing an additional image of the second portion or parameter of the vehicle.

16. The method of claim 15, wherein causing the angle of the camera of the mobile device to be adjusted includes at least one of:
automatically adjusting a spatial orientation of at least one of the mobile device or the camera of the mobile device with respect to the vehicle; or
instructing, via one or more user interfaces of the mobile device, a user of the mobile device to adjust the spatial orientation of the at least one of the mobile device or the camera of the mobile device with respect to the vehicle.

17. A method at a mobile device, the method comprising:
selecting, by the mobile device from a set of frames that depict a vehicle, a respective frame corresponding to each tag of more than one tag of a plurality of tags associated with a plurality of portions or parameters of vehicles, the selected, respective frame being a respective, representative image of a respective portion or parameter of the vehicle corresponding to the each tag and having a higher level of confidence of depicting the respective portion or parameter of the vehicle than levels of confidence of other frames, from the set of frames, depicting the respective portion or parameter of the vehicle; and
transmitting, by the mobile device via a wireless interface to a back-end server, an indication of the each tag and the respective, representative image corresponding to the each tag for use in estimating damage to the vehicle.

18. The method of claim 17,
further comprising obtaining, for each frame of the set of frames from a smart image tagging model operating on the set of frames, an indication of a respective tag and an indication of a respective level of confidence that the each frame depicts a respective portion or parameter of the vehicle corresponding to the respective tag, the smart image tagging model being a serialized, light-weight model stored on one or more memories of the mobile device; and
wherein the selecting is based on the indications of the respective tags and the indications of the respective levels of confidence.

19. The method of claim 18, wherein the set of frames is a stream of frames, and the method further comprises causing each frame of the stream of frames to be operated on by the smart image tagging model as the each frame is captured by a camera of the mobile device.

20. The method of claim 17, further comprising causing a spatial orientation of a camera of the mobile device to be adjusted for capturing additional images of the vehicle when at least one of:
none of the frames included in the set of frames is associated with a first particular tag of the plurality of tags, the first particular tag indicative of a first portion or parameter of vehicles; or
none of respective levels of confidence of an entirety of a set of frames corresponding to a second particular tag of the plurality of tags is above a threshold, the second particular tag indicative of a second portion or parameter of vehicles.

* * * * *